United States Patent
Bossaller et al.

(10) Patent No.: US 8,421,286 B2
(45) Date of Patent: Apr. 16, 2013

(54) KIT AND METHOD FOR ATTACHING A GROUNDING RING TO AN ELECTRICAL MOTOR

(75) Inventors: Terry L. Bossaller, Florissant, MO (US); Donald W. Conley, Bethalto, IL (US)

(73) Assignee: Nidec Motor Corporation, St. Louis, MO (US)

( * ) Notice: Subject to any disclaimer, the term of this patent is extended or adjusted under 35 U.S.C. 154(b) by 966 days.

(21) Appl. No.: 12/365,044

(22) Filed: Feb. 3, 2009

(65) Prior Publication Data

US 2010/0001602 A1 Jan. 7, 2010

Related U.S. Application Data

(60) Provisional application No. 61/078,263, filed on Jul. 3, 2008.

(51) Int. Cl.
*H02K 5/24* (2006.01)
*H02K 15/14* (2006.01)
*H02K 5/16* (2006.01)

(52) U.S. Cl.
USPC ............ 310/68 R; 310/85; 310/71; 310/232; 310/239; 361/220; 361/221

(58) Field of Classification Search ............... 310/68 R, 310/71, 85, 232, 239; 361/212, 216, 220, 361/221
See application file for complete search history.

(56) References Cited

U.S. PATENT DOCUMENTS

| | | | |
|---|---|---|---|
| 3,885,176 A * | 5/1975 | Cunningham | ................. 310/88 |
| 4,189,702 A | 2/1980 | Maloy | |
| 4,307,432 A | 12/1981 | Nishikawa | |
| 4,515,417 A | 5/1985 | Shiraishi | |
| 4,801,270 A | 1/1989 | Scarlata | |
| 4,920,289 A | 4/1990 | Saito | |
| 5,010,441 A | 4/1991 | Fox et al. | |
| 5,085,373 A | 2/1992 | Behr et al. | |
| 5,090,710 A | 2/1992 | Flower | |
| 5,227,950 A | 7/1993 | Twerdochlib | |
| 5,251,081 A | 10/1993 | Cossette et al. | |
| 5,400,208 A | 3/1995 | Pazda et al. | |
| 5,690,014 A | 11/1997 | Larkin | |
| 5,967,524 A | 10/1999 | Fedorovich | |
| 6,078,117 A | 6/2000 | Perrin et al. | |
| 6,315,475 B1 | 11/2001 | Carter et al. | |
| 6,386,546 B1 | 5/2002 | Fedorovich | |

(Continued)

FOREIGN PATENT DOCUMENTS

JP 7284240 A 10/1995

*Primary Examiner* — Tran Nguyen
*Assistant Examiner* — David Scheuermann
(74) *Attorney, Agent, or Firm* — Maginot, Moore & Beck LLP

(57) ABSTRACT

A method may be used to retroactively install a grounding ring on an electrical motor used with an inverter to reduce the likelihood that shaft currents affect motor bearings. The method includes securing a ring of conductive material to an endplate of an electrical motor at a position that enables a shaft extending through the endplate to pass through the ring, the ring of conductive material includes conductive material that extends from the ring to contact the shaft when the ring is secured to the endplate, and covering the ring of conductive material with a bearing cap that has an opening that enables the shaft to pass through the bearing cap.

14 Claims, 6 Drawing Sheets

U.S. PATENT DOCUMENTS

| | | |
|---|---|---|
| 6,419,233 B2 | 7/2002 | Orlowski |
| 6,608,410 B2 | 8/2003 | Sato et al. |
| 6,670,733 B2 | 12/2003 | Melfi |
| 6,686,673 B1 | 2/2004 | Komura et al. |
| 6,896,735 B2 | 5/2005 | Giuliano et al. |
| 6,909,868 B2 | 6/2005 | Yamada et al. |
| 7,193,836 B2 | 3/2007 | Oh et al. |
| 2001/0017495 A1 | 8/2001 | Sato et al. |
| 2002/0121821 A1 | 9/2002 | Ritter |
| 2002/0136161 A1 | 9/2002 | Cleereman et al. |
| 2003/0030340 A1 | 2/2003 | Tashiro |
| 2003/0057783 A1 | 3/2003 | Melfi |
| 2003/0086630 A1 | 5/2003 | Bramel et al. |
| 2004/0135016 A1 | 7/2004 | Baumann et al. |
| 2004/0184215 A1 | 9/2004 | Oh et al. |
| 2004/0233592 A1 | 11/2004 | Oh et al. |
| 2006/0007609 A1 | 1/2006 | Oh et al. |
| 2007/0040459 A1* | 2/2007 | Oh .............................. 310/68 C |
| 2007/0138748 A1 | 6/2007 | Orlowski et al. |

* cited by examiner

KIT AND METHOD FOR ATTACHING A GROUNDING RING TO AN ELECTRICAL MOTOR

TECHNICAL FIELD

This disclosure relates generally to electrical motors and, more particularly, to electrical motors in which shaft currents may be induced.

BACKGROUND

Electrical motors are used in a number of applications including condenser fans. Under some conditions, electrical currents may be induced in the shaft of the electrical motor. For example, to make condenser motors more electrically efficient, inverters are frequently incorporated in the motors. One issue that arises from the use of inverters is the occurrence of currents in the shafts of the motors that are caused by the inverters. These currents may flow to bearings that are mounted about the motor shaft within the motor housing. These currents may result in arcing between bearings and bearing races. Such arcing over a period of time may pit the bearings and degrade the life of the bearings.

To deal with the generation of currents in motor shafts caused by inverters, grounding rings have been developed. These grounding rings include a ring of conductive material that is typically formed with a toroidal shape. In the central bore of the toroid, brushes made of conductive material extend from the inside diameter of the ring into the central bore. By mounting the grounding ring about the motor shaft to enable the brushes to contact the motor shaft, any currents in the shaft can be conducted through the brushes and the grounding ring into the housing of the motor, which is electrically grounded. In the past, these grounding rings have sometimes been installed by tapping two or more holes in an endplate of the motor housing at positions that would be outside the diameter of a grounding ring concentrically mounted about a motor shaft. Brackets having a hole in one end are secured to the endplate by passing a threaded fastener through the hole and rotating the threaded fastener in the threaded hole. The outboard end of the bracket is positioned over the grounding ring before the threaded fastener is firmly tightened to secure the bracket against the grounding ring and hold the grounding ring in place about the shaft. Unfortunately, the bracket disrupts the continuous nature of the outside diameter of the grounding ring and adversely impacts the ability to mount barriers, such as bearing caps and water slingers, over the grounding ring. In other installations, the grounding rings were installed on an endplate without a bearing cap or water slinger. These components help reduce the amount of particulate and other debris from entering the motor housing. Consequently, a way of installing grounding rings without interfering with the placement of environmental debris barriers is desirable.

SUMMARY

A method may be used to retroactively install a grounding ring on an electrical motor without interfering with the placement of environmental debris barriers has been developed. The method includes securing a ring of conductive material to an endplate of an electrical motor at a position that enables a shaft extending through the endplate to pass through the ring, the ring of conductive material includes conductive material that extends from the ring to contact the shaft when the ring is secured to the endplate, and covering the ring of conductive material with a bearing cap that has an opening that enables the shaft to pass through the bearing cap.

A kit has been developed that enables implementation of the method for retroactively installing a grounding ring about a motor shaft. The kit includes a ring of conductive material having a central bore and at least one hole through the ring to enable a threaded fastener to be inserted through the hole and engage a threaded opening in an endplate of an electrical motor, the central bore having at least one electrical conductor extending from the ring into the central bore to enable the electrical conductor to be coupled electrically to a motor shaft, at least one threaded member having a head and a threaded shaft, the threaded shaft being received within a threaded bore in the endplate to secure the ring of conductive material to the endplate, and a cap that is configured to engage the endplate and secure the cap over the ring, the cap having a central bore to enable the motor shaft to pass through the cap.

BRIEF DESCRIPTION OF THE DRAWINGS

The foregoing aspects and other features of a kit and method for retroactively installing a grounding ring in an electrical motor are explained in the following description, taken in connection with the accompanying drawings.

DETAILED DESCRIPTION

Figure 1:
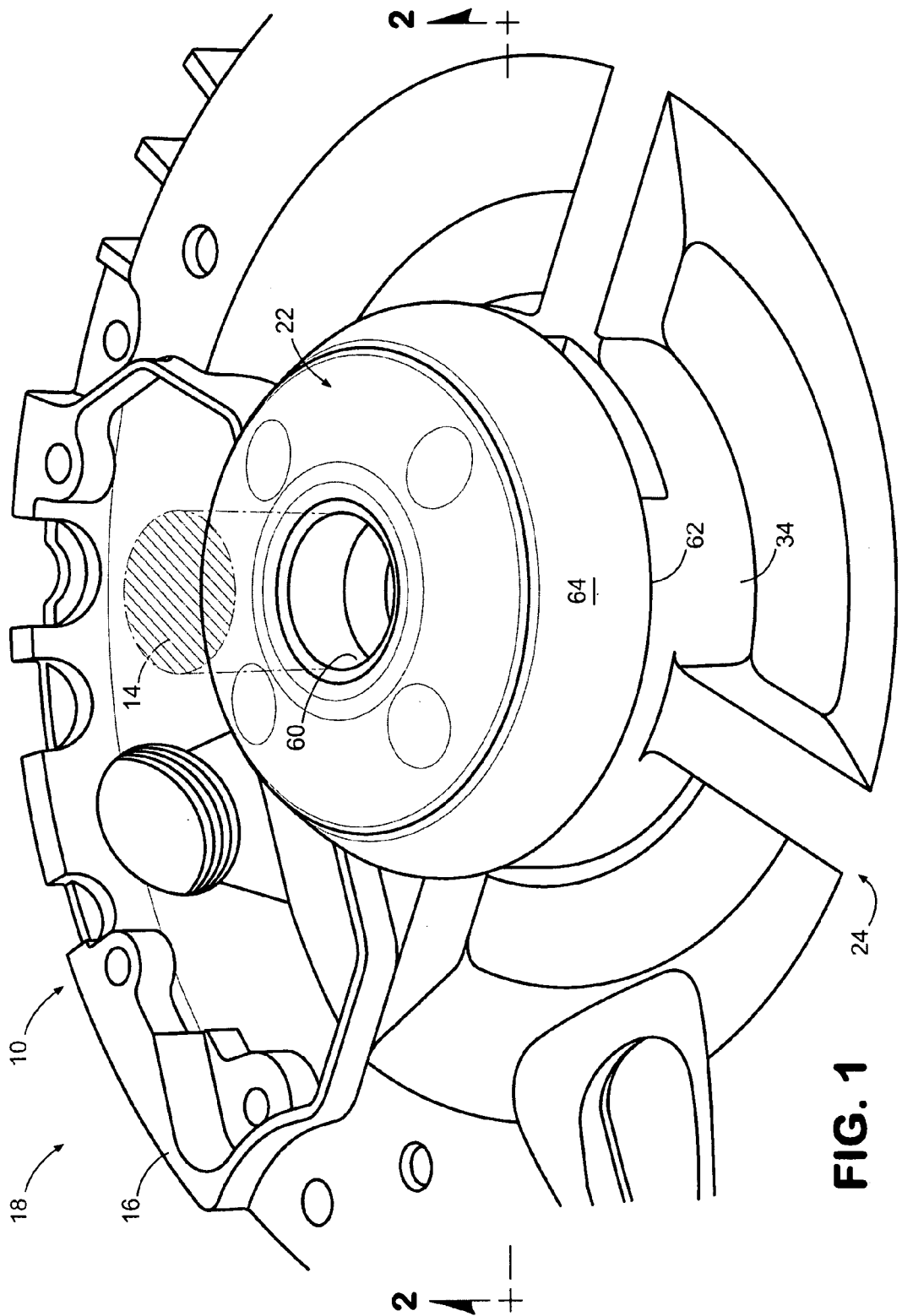
FIG. 1 depicts a perspective view of the grounding ring kit assembled onto the motor endplate, according to an exemplary embodiment of the present disclosure.

According to the present disclosure and referring to FIG. 1, a grounding ring kit 10 is shown after installation on an endplate 16 of a motor 18. The only visible component after installation is the water slinger 22. The water slinger 22 and the bearing cap 20 (see FIG. 2) to which the slinger 22 is mounted help form a barrier to debris that may be in the operating environment for the motor 18. Prior to installation of the grounding ring as discussed more fully below, the water slinger 22 and bearing cap 20, if present, are removed from a motor 18 being retroactively fitted with a grounding ring. Such removal is not necessary during the manufacture of an electrical motor as the bearing cap 20 and water slinger 22 are mounted after the grounding ring has been installed.

Figure 2:
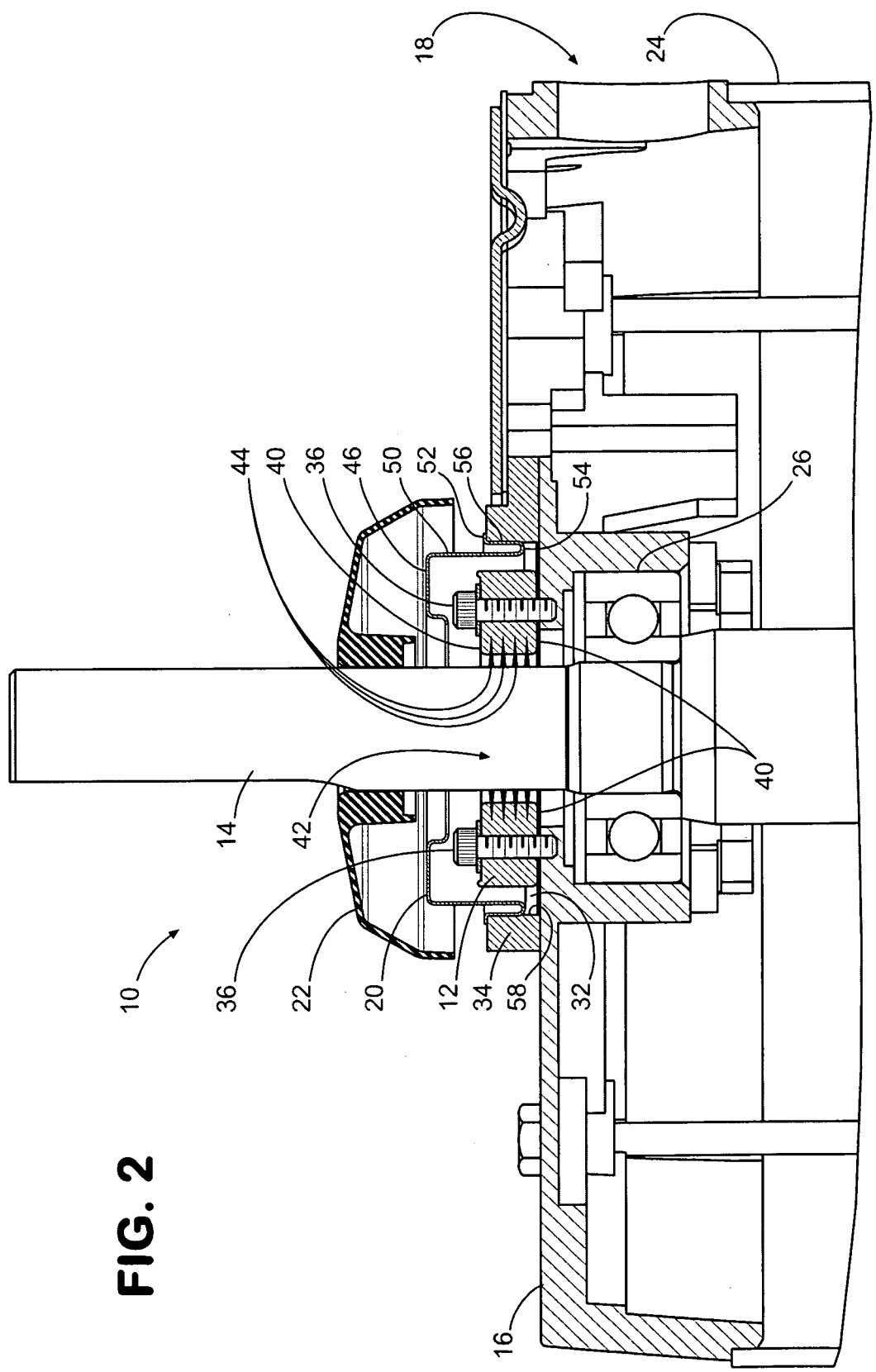
FIG. 2 depicts a cross sectional view of the grounding ring kit of FIG. 1 along the line 2-2 in the direction of the arrows.

As shown in more detail in FIG. 2, the kit 10 includes a grounding ring 12, a bearing cap 20, and a water slinger 22. The grounding ring 12 is fitted over motor shaft 14 and threadably secured by threaded fasteners 36 to endplate 16 of electric motor 18. The bearing cap 20 is also fitted over motor shaft 14 and frictionally fitted to a hub 34 between the outside edge of the grounding ring 12 and the inside wall of a recessed well 32 of the endplate 16, which is centered about the shaft 14. The water slinger 22 is positioned over the motor shaft 14 and frictionally fitted to the shaft 14 to secure the water slinger to the motor shaft 14.

Figure 3:
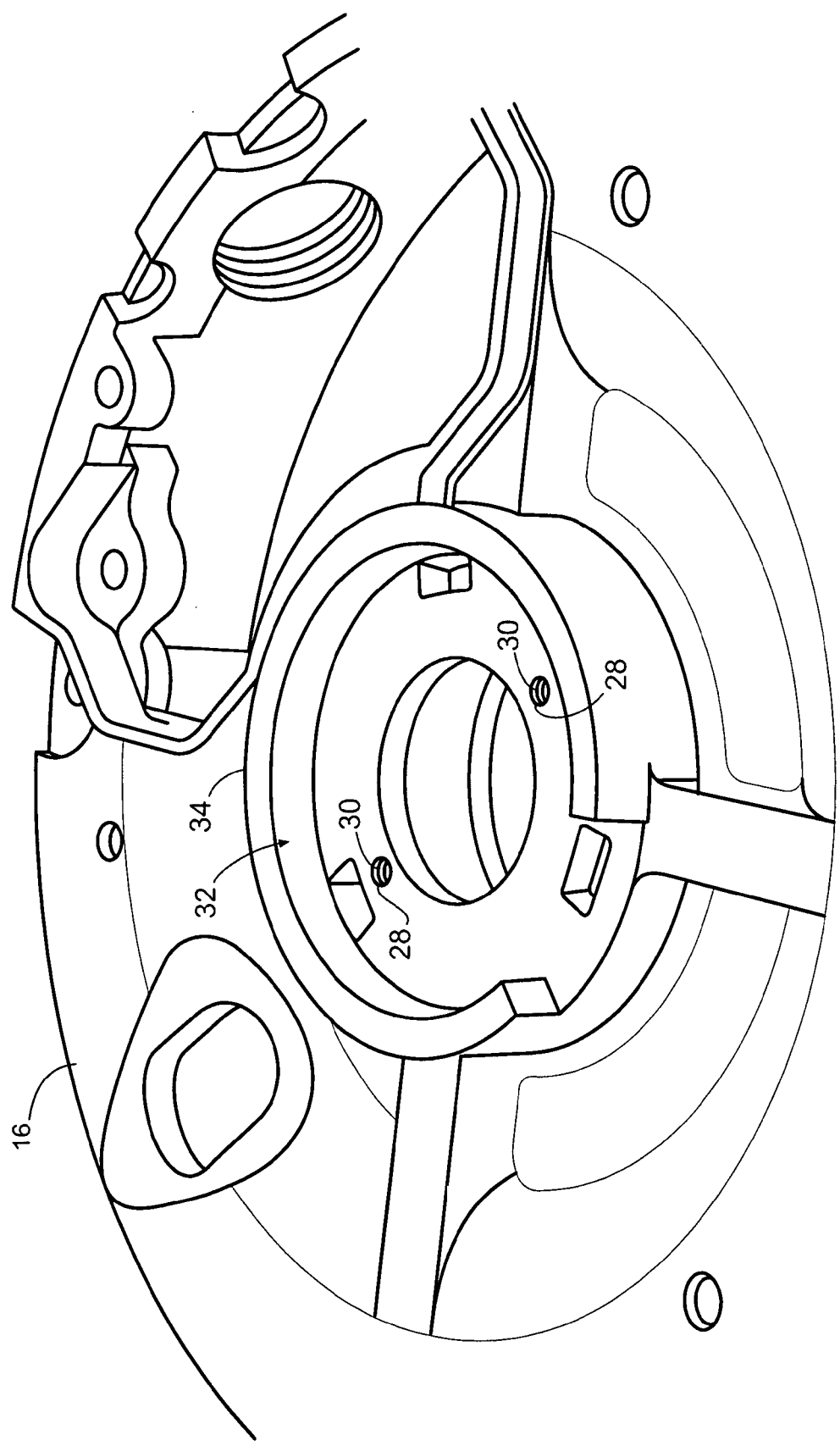
FIG. 3 depicts a partial perspective view of the motor endplate of FIG. 1 showing the threaded holes for receiving fasteners to secure the kit of FIG. 1 onto the motor endplate of FIG. 1.

Referring now to FIG. 3, the recessed well 32 is exposed following the removal of the water slinger 22 and the bearing cap 20. The endplate 16 in FIG. 3 is shown separately from the motor to facilitate the discussion of the grounding ring installation. Retroactive installations in operational environments occur with the endplate 16 remaining attached to the motor housing. Within the recessed well 32 of the hub 34 is a pair of spaced-apart openings 28. Each opening 28 includes internal threads 30 for receiving threaded fasteners 36 that secure the grounding ring 12 to the motor endplate 16. In another embodiment, openings may not be threaded, but suitably sized to receive thread forming screws. In another embodiment, the ring may be secured to the endplate 16 using conductive epoxy or the like. Other attachment devices are also contemplated as being within the scope of the present invention.

Figure 4:
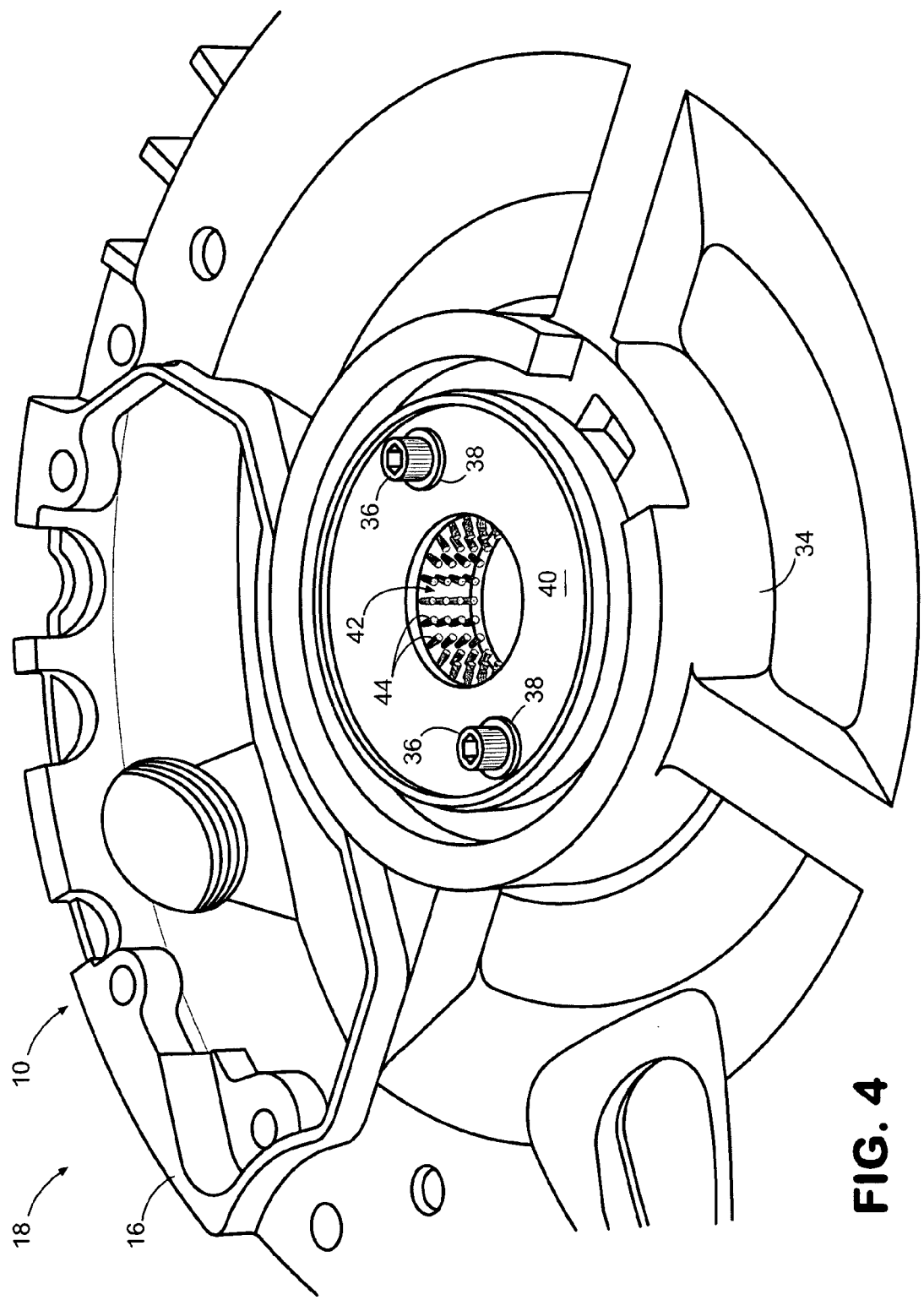
FIG. 4 depicts a partial perspective view of the motor endplate of FIG. 1 showing a grounding ring of the grounding ring kit of FIG. 1 in position on the motor endplate with fasteners fitted into the threaded holes of FIG. 3.

Referring now to FIG. 4, the grounding ring 12 is shown secured to the endplate 16 by external fasteners in the form of socket headed cap screws 36. A lock washer 38 is fitted to each screw 36 to help securely lock the ring 12 to the endplate 16. The grounding ring 12 has a generally cylindrical shape with opposed parallel planar ends 40 (FIG. 2) and a cylindrical bore 42 fitted to receive the motor shaft 14 of the motor 18. The grounding ring 12 fits into recess 32 of the hub 34. The grounding ring 12 is made of an electrically conductive material and includes electrically conductive brushes 44 that extend inwardly from the bore 42 of the ring 12 to contact the motor shaft 14. Thus, the brushes 44 provide an electrically conductive path from the shaft 14 to the ring 12. One of the parallel planar ends 40 of the grounding ring 12 contacts the endplate 16 to provide an electrical path from the grounding ring 12 to the endplate 16. The screws 36 are typically made of an electrically conductive material and provide a further electrical path from the ring 12 to the endplate 16. Other components (not shown) are electrically connected to the endplate 16 to complete the grounding of the shaft 14 through the grounding ring 12.

The grounding ring 12 and the brushes 44 may be made of any electrically conductive material. As shown, the grounding ring 12 and the brushes 44 are made of an electrically conductive carbon graphite material. The brushes may be integral with the ring 12 with some of the bonding material removed at the brushes 44 to expose carbon fibers that provide contact with the shaft 14. Alternatively, the grounding ring 12 and the brushes 44 may be made of an electrically conductive metal, such as aluminum, copper or a ferrous material.

Figure 5:
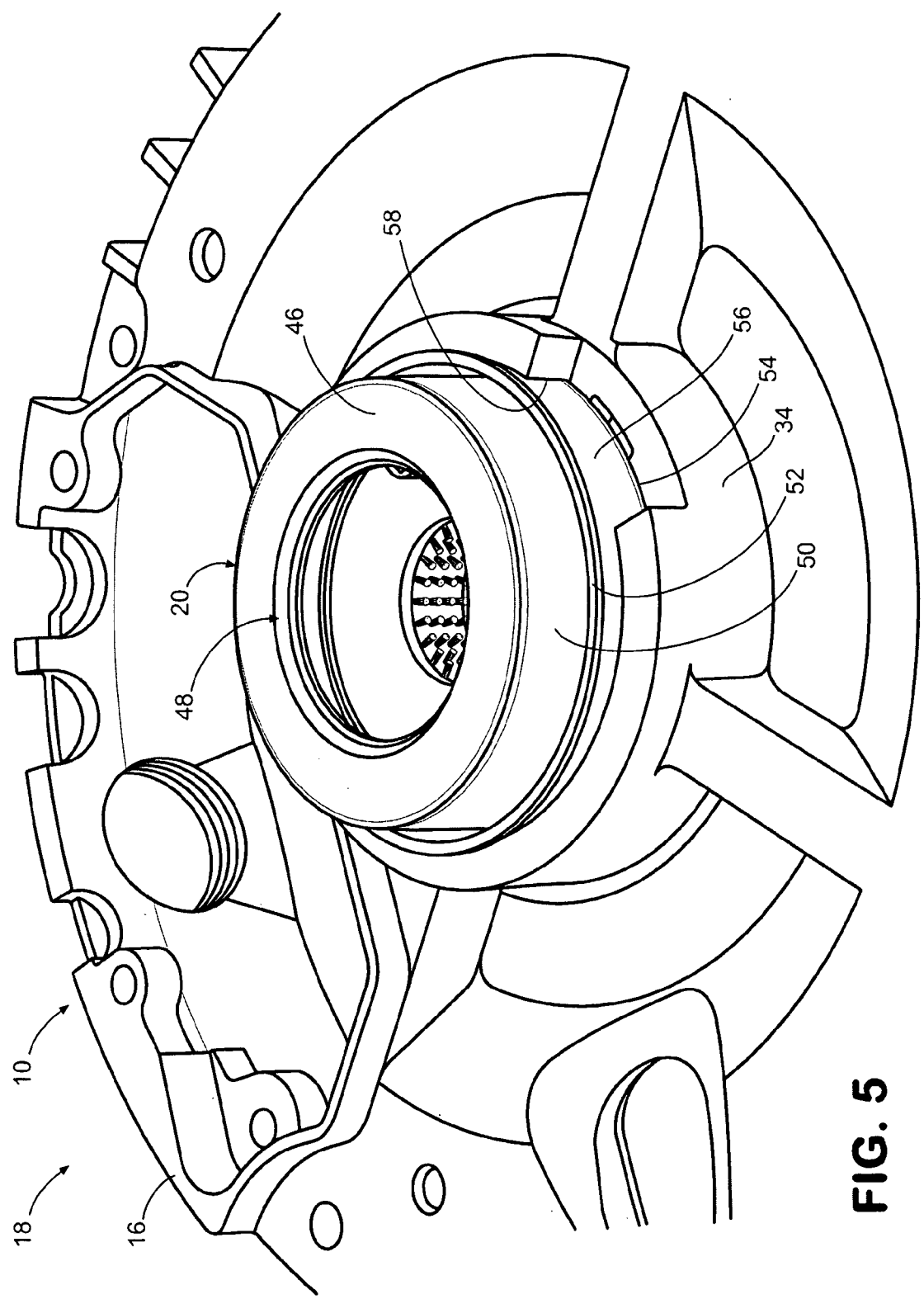
FIG. 5 depicts a partial perspective view of the motor endplate of FIG. 1 showing a bearing cap of the grounding ring kit of FIG. 1 in position on the grounding ring of FIG. 4.

Referring now to FIG. 5, the bearing cap 20 is shown in position on the endplate 16 of the motor 18. The bearing cap 20 includes an end face 46 having an opening 48 for clearance passage of the motor shaft 14. The cap 20 also includes a generally cylindrical wall 50 that extends from the end face 46. An end 54 of the wall 50 includes a rim 52 that extends from a cylindrical flange 56 (see also FIG. 2). The flange 56 is generally concentric with the cylindrical wall 50. The cylindrical flange 56 is interference fitted to inner periphery 58 of the hub 34 to secure the cap to the hub 34 of the endplate 16 of the motor 18. Other configurations of the cap may be used having an opening for the motor shaft 14 and a feature, for example, other interfering surfaces (not shown) or fasteners (not shown) to secure the cap 20 to the hub 34. The cap 20 may be made of any durable suitable material such as a metal, a composite, or a polymer. For example, the cap may be stamped from a ferrous metal.

Referring again to FIG. 1, the water slinger 22 is shown in position on motor shaft 14. The water slinger 22 includes a central opening 60 and, at the opening 60 has an interference fit with the shaft 14. Alternatively, fasteners (not shown) may secure the slinger 22 onto the shaft 14. The slinger 22 rotates with the shaft 14 to sling moisture from the slinger 22 and away from the grounding ring 12 and the motor bearing 26 (FIG. 2). Inner face 62 of the slinger 22 is spaced slightly from end shield 16. The slinger 22 has a smooth continuous periphery 64 extending from the central opening 60 to the inner face 62. The periphery 64 extends slightly past hub 34 of endplate 16 to direct moisture away from hub 34. The smooth continuous periphery 64 assists in the flinging of the moisture. The slinger 22 is made of a suitable durable material, for example, a molded plastic.

The grounding ring kit 10 may be used with a new motor 18 to provide an electrical grounding and a moisture barrier to the bearing or may be used to retrofit an existing motor (not shown) that was not originally equipped with either electrical grounding or a moisture barrier, or both. When used to retrofit an existing motor, the existing slinger (not shown), if any, and the existing bearing cap (not shown), if any, need to be removed from the motor. The endplate (not shown) of the existing motor needs to have the threaded openings (not shown) prepared, if not already provided. Grounding ring 12 of the grounding ring kit 10 is then fitted over the shaft (not shown) and secured to the endplate by screws 36 of the grounding ring kit 10. The bearing cap of the grounding ring kit 10 is interference fitted into the hub 34. Water slinger 22 is then securely fitted over shaft and positioned slightly spaced from the endplate.

Referring again to FIG. 2, when used on a new motor, the grounding ring 12 of the grounding ring kit 10 is fitted over shaft 14 and secured to the endplate 16 by screws 36 of the grounding ring kit 10. The bearing cap of the grounding ring kit 10 is interference fitted into the hub 34 and the water slinger 22 of the grounding ring kit 10 is then securely fitted over shaft 14 and positioned slightly spaced from the endplate 16.

Figure 6:
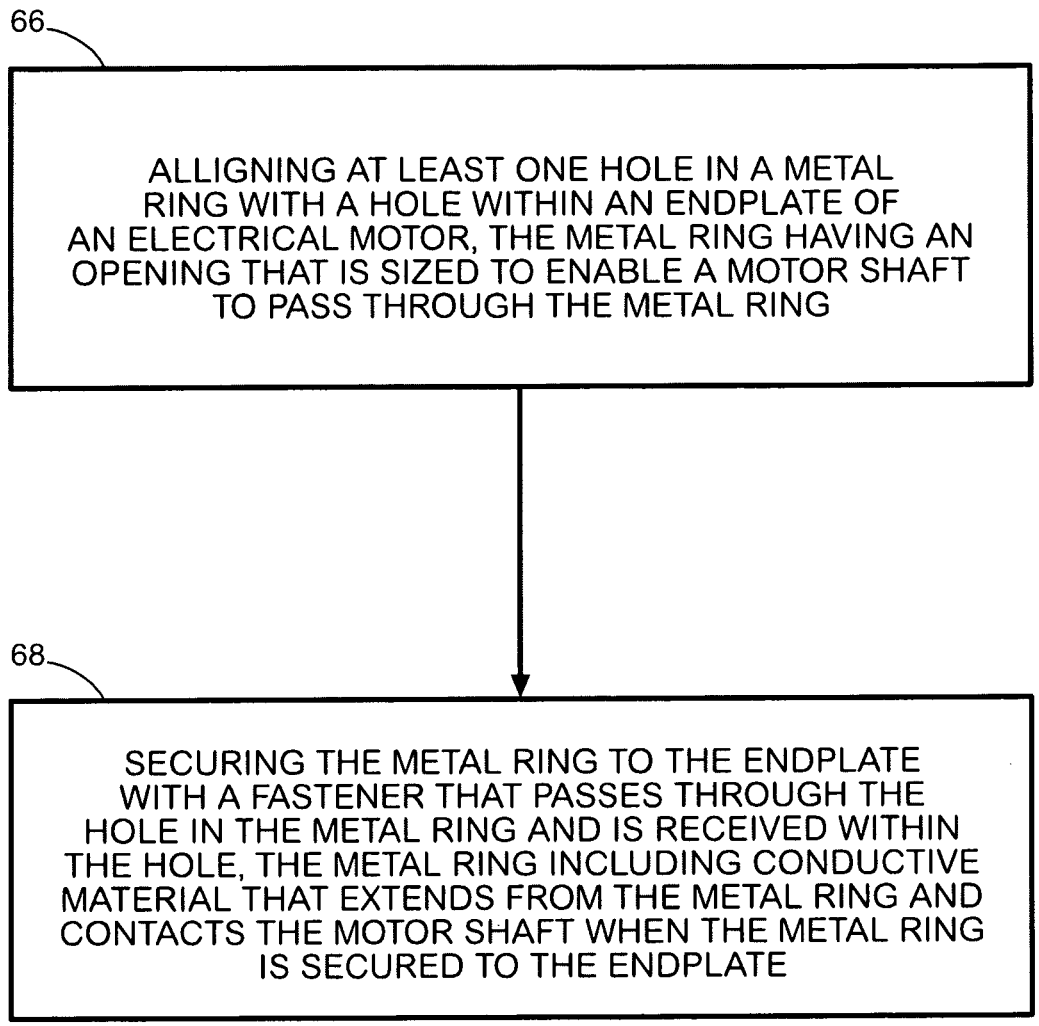
FIG. 6 depicts a flow diagram for a method of retroactively installing a grounding ring on an electrical motor used with an inverter according to the present disclosure.

Referring now to FIG. 6, a method for retroactively installing a grounding ring on an electrical motor is shown. The method includes aligning at least one hole in a ring of conductive material with a hole within an endplate of an electrical motor, as depicted in block 66. The ring of conductive material has an opening that is sized to enable a motor shaft to pass through the ring. The method also includes securing the ring to the endplate with a fastener that passes through the hole in the ring and is received within the hole, as depicted in block 68. The fastener may be, for example, a threaded fastener that fits into a threaded opening in the endplate, or, the fastener may be a self-threading fastener that produces threaded engagement with the endplate. The ring of conductive material includes additional conductive material that extends from the ring and contacts the motor shaft when the ring is secured to the endplate. In an alternative embodiment, the method may be performed by securing the ring of conductive material to the endplate of the motor with conductive epoxy rather than with fasteners received in holes in the ring.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A kit for retroactively installing a grounding ring that electrically couples a motor shaft to electrical ground comprising:
   an annular ring of conductive material having a central bore and at least one hole through the annular ring that is outboard of the central bore to enable a threaded fastener to be inserted through the hole in the annular ring and engage an opening in an endplate of an electrical motor, the central bore having at least one electrical conductor extending from the annular ring of conductive material into the central bore to enable the electrical conductor to be coupled electrically to a shaft extending through the endplate;
   at least one threaded member having a head and a threaded shaft, the threaded shaft being inserted through the hole in the annular ring and received within the opening in the endplate to secure the annular ring of conductive material to the endplate; and
   a bearing cap that is configured to engage the endplate and secure the bearing cap over the annular ring, the bearing cap having a central bore to enable the shaft to pass through the bearing cap.

2. The kit of claim 1, the bearing cap being further configured to interference fit within a hub of the endplate.

3. The kit of claim 1 further comprising:
   a water resilient cap that couples to the shaft at a position over the bearing cap to direct water away from the ring of conductive material.

4. The kit of claim 3, the electrical conductor being comprised of a plurality of carbon graphite fibers.

5. The kit of claim 1 wherein the ring of conductive material is made of metal.

6. The kit of claim 1 wherein the threaded member is a thread forming screw.

7. The kit of claim 3, the water resilient cap being made of molded plastic.

8. An electrical motor comprising:
   an endplate having an opening through which an output shaft of the electrical motor extends;
   an annular ring of conductive material having a central bore and an opening outboard of the central bore, the annular ring of conductive material being secured to an endplate of the electrical motor in a position that enables the output shaft to pass through the central bore, the central bore of the annular ring having at least one electrical conductor extending from the annular ring of conductive material into the central bore to enable the electrical conductor to be coupled electrically to the shaft extending through the opening in the endplate;
   at least one threaded member having a head and a threaded shaft, the threaded shaft passing through the opening in the ring of conductive material and being received within an opening in the endplate to secure the annular ring of conductive material against the endplate by directly engaging the head of the threaded member against the annular ring; and
   a bearing cap that is configured to engage the endplate and secure the bearing cap over the annular ring and the head of the threaded member, the bearing cap having a central bore to enable the shaft to pass through the bearing cap.

9. The electrical motor of claim 8 further comprising:
   a water resilient cap that couples to the shaft at a position above the bearing cap to direct water away from the ring of conductive material.

10. The electrical motor of claim 9, the water resilient cap being further configured to interference fit within a hub of the endplate.

11. The electrical motor of claim 10, the water resilient cap being made of molded plastic and configured to interference fit about the shaft.

12. The electrical motor of claim 8, the electrical conductor being comprised of a plurality of conductive carbon graphite fibers extending from the ring.

13. The kit of claim 3, the water resilient cap being configured to interference fit about the shaft.

14. The kit of claim 1, the electrical conductor being comprised of a plurality of conductive fibers extending from the ring of the conductive material.

* * * * *